United States Patent [19]

Binnig et al.

[11] Patent Number: 5,739,425

[45] Date of Patent: Apr. 14, 1998

[54] CANTILEVER WITH INTEGRATED DEFLECTION SENSOR

[75] Inventors: Gerd Karl Binnig, Wollerau; Heinrich Rohrer, Richterswil; Peter Vettiger, Langnau, all of Switzerland

[73] Assignee: International Business Machines Corporation, Armonk, N.Y.

[21] Appl. No.: 699,810

[22] Filed: Aug. 19, 1996

[30] Foreign Application Priority Data

Sep. 1, 1995 [WO] WIPO ............... PCT/IB95/00724

[51] Int. Cl.[6] ............................................ G01B 7/34
[52] U.S. Cl. ............... 73/105; 73/514.36; 73/862.634; 73/862.639
[58] Field of Search ............... 73/105, 862.634, 73/862.639, 514.21, 514.36; 250/306

[56] References Cited

U.S. PATENT DOCUMENTS

| | | | |
|---|---|---|---|
| 4,249,624 | 2/1981 | Kuhnle | 73/862.634 X |
| 4,454,770 | 6/1984 | Kistler | 73/862.633 |
| 4,464,419 | 8/1984 | Horn | 427/58 |
| 4,577,709 | 3/1986 | Shibahara et al. | 73/862.634 X |
| 4,605,919 | 8/1986 | Wilner | 73/862.634 X |
| 4,670,092 | 6/1987 | Motomedi | 73/514.36 X |
| 5,021,364 | 6/1991 | Akonira et al. | 250/306 X |
| 5,239,870 | 8/1993 | Kaneko | 73/514.36 X |
| 5,321,685 | 6/1994 | Nose et al. | 250/306 X |
| 5,345,815 | 9/1994 | Albrecht et al. | 73/105 |
| 5,354,985 | 10/1994 | Quote | 250/306 |
| 5,444,244 | 8/1995 | Kirk et al. | 250/306 |
| 5,537,863 | 7/1996 | Fujiu et al. | 73/105 |
| 5,583,286 | 12/1996 | Matsuyama | 73/105 |

OTHER PUBLICATIONS

*Patent Abstracts of Japan* vol. 18, No. 231, Grp P1756, "Semiconductor Acceleration Detecting Device" ABS Pub. Date Jun. 17, 1994 (6-74966).

"Pick Up Cartridge" *Patent Abstracts of Japan* Abs Grp P005, vol. 4, No. 43, Abs Pub Date Apr. 4, 1980 (55-14570).

"Acceleration Sensor and Manufacture Thereof"; *Patent Abstracts of Japan* Abs Grp E1512, vol. 18, No. 105 Abs Pub Date Feb. 21, 1994 (5-304303).

"Integrated AFM Sensor and Manufacture Thereof" *Patent Abstracts of Japan* Abstract of (6-300557) Dated Oct. 28, 1994.

"Integrated Multifunction SPM Sensor" *Patent Abstracts of Japan* Abstract of (8-5642), Dated Jan. 12, 1996 Inventor Nobutoka Komiya.

*Primary Examiner*—Thomas P. Noland
*Attorney, Agent, or Firm*—Stephen S. Strunck

[57] ABSTRACT

A cantilever for scanning probe microscopy and other force or deflection measurements is described. The cantilever includes at least one one integrated strain sensing element within a constriction section (62). The cantilever is improved over known cantilevers by reducing the longitudinal extension of the constriction, such that its contribution to the total deflection of the cantilever is reduced. The design of the cantilever is further improved by applying a beam (63) with an essentially triangular cross section in either a vertical or a horizontal plane or both.

17 Claims, 6 Drawing Sheets

CANTILEVER WITH INTEGRATED DEFLECTION SENSOR

FIELD OF THE INVENTION

This invention relates to a cantilever beam, in particular for a scanning probe apparatus for an atomic force microscope, which beam includes strain sensor elements for converting its mechanical movements or displacements into electrical signals, with said signals being for example characteristic of the structure of the scanned surface.

BACKGROUND OF THE INVENTION

Cantilevers of the kind to which the present invention is directed are for example described in the U.S. Pat. No. 5,345,815. In the described microminiature cantilever structure a piezoresistive resistor is embedded in at least the fixed end of the cantilever arm. Deflection of the free end of the cantilever arm produces stress along the cantilever. That stress changes the piezoresistive resistor's resistance at the base of the cantilever in proportion to the cantilever arm's deflection. Resistance measuring apparatus is coupled to the piezoresistive resistor to measure its resistance and to generate a signal corresponding to the cantilever arm's deflection. The microminiature cantilever is formed on a semiconductor substrate. A portion of the free end of the cantilever arm is doped to form an electrically separate U-shaped piezoresistive resistor. The U-shaped resistor has two legs oriented parallel to an axis of the semiconductor substrate having a non-zero piezoresistive coefficient. A metal layer is deposited over the semiconductor's surface and patterned to form an electrical connection between the piezoresistive resistor and a resistance measuring circuit, enabling measurement of the piezoresistive resistor's resistance. Finally, the semiconductor substrate below the cantilever arm is substantially removed so as to form a suspended cantilever structure. For the use of the cantilever in scanning probe microscopy and related applications, a tip is mounted on tile free end of the cantilever.

While the type of cantilever described in U.S. Pat. No. 5,345,815 is closely related to the kind to which the present invention is directed, there are numerous examples of miniature accelerometers and pressure gauges known to the art which bear some resemblance to a cantilever structure. A careful analysis of these structures however reveals that they are not applicable in SPM due to an insufficient flexibility of the suspended arm, which is either formed as or carries a stiff mass. An example of such an accelerometer is described by L. M. Roylance and J. B. Angell in: IEEE Transactions on Electron Devices, Vol. ED-26, No. 12, December 79 pp. 1911–1917.

Independent from the specific cantilever structure and its application, attempts are known to improve the sensitivity of the piezoresitive strain measurement by design optimization. Calculations and experiments published for example in: Sensors and Actuators 17 (1989), pp. 225–233, lead to a linearly and exponentially tapered resistor layer on the cantilever. Another proposal for an optimized design is described in U.S. Pat. No. 4,605,919, where the cantilever has a groove at its base end. The piezoresistive sensor bridges the groove. Though superior sensitivity of this design over others is claimed, the proposed design is found to be difficult to realize, in particular when the thickness of the cantilever is less than 10 μm.

It is therefore an object of the current invention to improve the design of the known cantilever such as to increase the sensitivity and the signal-to-noise (S/N) ratio of the deflection measurement.

SUMMARY OF THE INVENTION

The invention is characterized by the features as set forth in the appended claims.

The cantilever of the invention is particularly characterized by having a constriction section of reduced lateral dimensions and/or Young's modulus. The lateral dimension can be thickness and width in case of a beam-type cantilever structure with rectangular cross section or the diameter in case of a cylindrical cantilever. The Young's modulus defines the elasticity of a material. It can be locally altered by replacing part of the base material with another material or by changing the elasticity of the material using chemical or physical processes, such as doping, ion implanting, or high-energy radiation.

Another important feature of the cantilever in accordance with the invention is that an integrated strain sensor, which detects the deflection of the cantilever, is fully in contact with or embedded in the cantilever even at the site of the constriction. This is seen as a major advantage over the bridge-type strain sensors as proposed for example in U.S. Pat. No. 4,605,919 for the reason of being easier to implement without suffering a significant loss in sensitivity. A bridge-type sensor would in addition considerably reduce the effect of the constriction when the total thickness of the cantilever is less than 10 μm.

Yet another important feature of the invention is that the length of this constriction section is significantly smaller than the total length of the cantilever. While the ratio of both lengths should be at least 1:5 to give satisfactory results, more preferably 1:10 or even 1:100, no corresponding upper limit can be given as the amplification increases with a decreasing length of the constriction. When utilizing for example an artificially induced hairline crack as a constriction, ratios of 1:10000 and even 1:100000 seem achievable.

The cantilever in accordance with the present invention may alternatively be characterized by referring to the known electro-mechanical transducers with a hinge section as commonly encountered in the field of miniaturized pressure sensor and accelerometers: These devices are not suitable for the kind of application to which the current invention is related. The known pressure sensors and accelerometer, as for example described in the IEEE Transactions on Electron Devices, Vol. ED-26, No. 12, December 79 pp. 1911–1917 by L. M. Roylance and J. B. Angell or in the U.S. Pat. No. 4,605,919 to Wilner, usually have a rigid mass or paddle attached to the soft hinge section. It is due to the relatively small stiffness of the hinge section and the rigidity and large mass of the foremost pad of the transducer, that these known devices are not applied in the field of scanning probe microscopy.

Hence contrary to these known transducers, it is a further characteristic feature of the invention that the ratio of the compliance, i.e. the reciprocal of the stiffness, $C_c$ of a cantilever with a constriction to the compliance $C_u$ of the cantilever without the constriction $C_c/C_u = 1 + n\lambda/\epsilon$ is less than 10, more preferably a value close to 3, however not less than 0.1. The factor n is determined by the shape of the cantilever: for a rectangular beam, the value of n equals 3; for a triangular-shaped beam n reduces to 2. The letter $\lambda$ denotes a longitudinal constriction factor defined as the ratio of the effective length of the constriction over the remaining length of the cantilever; and $\epsilon$ is defined as a transversal constriction factor by the product of the third power of the ratio of the thicknesses, the ratio of the widths, and the ratio of the Young's moduli of the cantilever in the constriction section and in the remaining part of the cantilever, respectively. The factor ε hence characterizes the lateral dimensions and the material properties of the construction.

This ratio nλ/ε can be estimated for a typical accelerometer like the one described by Roylance and Angell (see above) to be at around $$n \times \frac{\lambda}{\epsilon} \simeq 2 \times \frac{\frac{0.4 \text{ mm}}{1.2 \text{ mm}}}{\left(\frac{40 \text{ }\mu\text{m}}{200 \text{ }\mu\text{m}}\right)^3 \times \left(\frac{0.2 \text{ mm}}{1 \text{ mm}}\right) \times 1} = 375.$$

The characteristic feature of the cantilever and its construction section as proposed above ensures that the whole cantilever remains flexible and is not reduced to a stiff mass attached to a soft hinge. This flexibility, not encountered among the known accelerometers and pressure gauges, is necessary in SPM related applications to achieve the sensitivity required in a large bandwidth.

Apart from reducing the length of the constriction section of the cantilever structure, it is also a preferred feature of the invention to reduce the longitudinal dimensions of the active area of the deflection sensing elements which are integrated in the constriction section. For V-shaped grooves, the sensing elements therefore are preferably designed such as extending along the groove.

As the employed deflection sensors are sensitive to the physical stress built up when the cantilever is bent, several preferred embodiments of the invention are characterized by optimizing the stress distribution within the cantilever structure. Thus the sensitivity of the deflection sensors in the constriction area can be enhanced by shaping the cantilever triangularly in the longitudinal direction, e.g., by tapering it towards the foremost end, by using a triangular cross section, or by a combination of both methods.

In a further preferred embodiment of the invention, the cantilever has a section of enhanced stiffness in the immediate vicinity of the constriction section. This length of this further section does not extend over the total length of the cantilever; it is preferably restricted to less than 0.5 times the total length of the cantilever. Even more preferred it has approximately the length as the constriction section, i.e. both lengths differ by 30 percent at the most. In a preferred embodiment, the section with enhenced stiffness is realized by enlarging the cross section of the cantilever. Other possibilities include increasing the Young's modulus of the cantilever in this section.

As mentioned above a construction in accordance with the present invention is not restricted to a change of lateral dimensions. It can also be achieve by altering the elastic constants of the material in the constriction section by replacing pad of the base material of the cantilever by a more elastic materials, e.g. an organic polymer. It may be instructive to regard the lateral, i.e., the geometric constrictions as an extreme example of such an elastic constriction wherein the base material is replaced by air.

Possible usage of the new cantilever is not restricted to Scanning Probe Microscopy (SPM) related applications. As the new type of cantilever enhances the sensitivity for any deflection measurement, it can be employed in various types of micromechanical forcemeters, e.g. accelerometers or pressure gauges.

These and other novel features believed characteristic of the invention are set forth in the appended claims. The invention itself however, as well a preferred mode of use, and further objects and advantageous thereof, will best be understood by reference to the following detailed description of illustrative embodiments when read in conjunction with the accompanying drawings.

DESCRIPTION OF THE DRAWINGS

The invention is described in detail below with reference to the following drawings.

MODE(S) FOR CARRYING OUT THE INVENTION

Figure 1A:
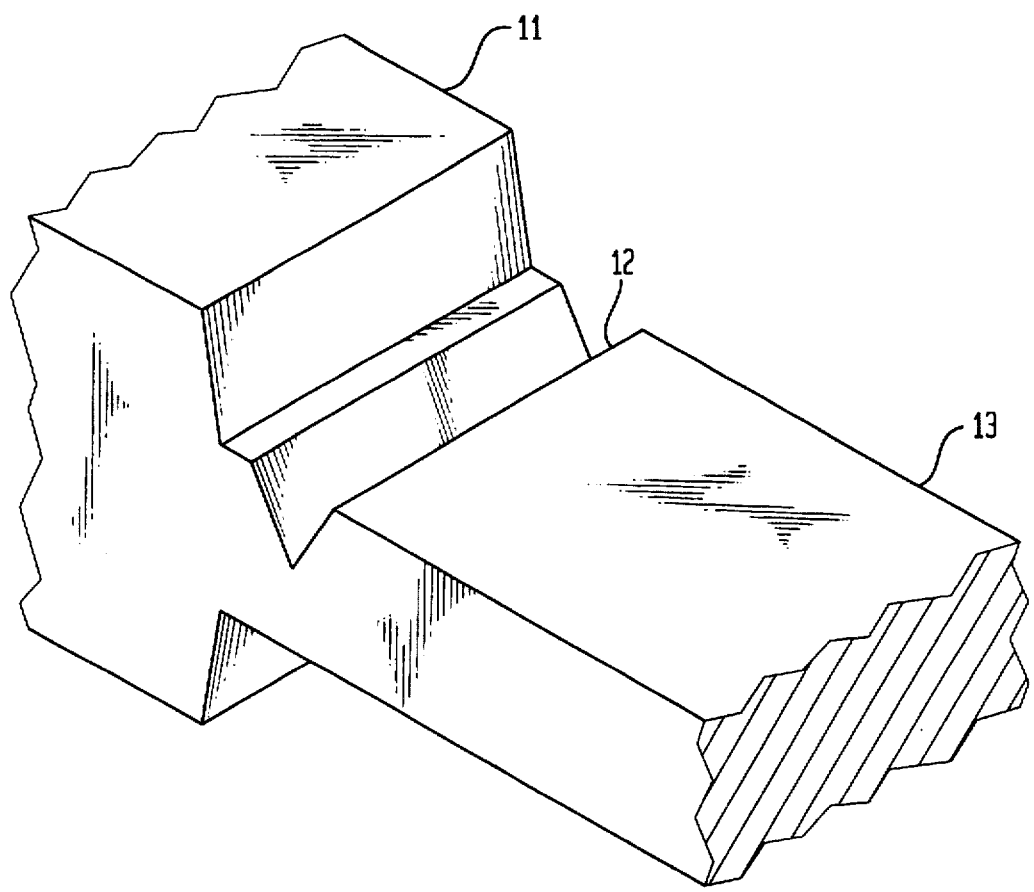
FIGS. 1A, B show different views on a first type of constriction section (thickness constriction) in a cantilever in accordance with the present invention.

Referring to FIG. 1, some basic parameters are introduced and defined for a better understanding and appreciation of the present invention. FIGS. 1A, B show a tilted top view and a cross section, respectively, of a cantilever beam with a constriction. The whole cantilever structure consists of three parts: a supporting structure 11, which is assumed for the following to be fixed; a constriction section 12; and, attached to it, the cantilever beam 13 itself, with a tip (not shown). The transitional pad of the cantilever between the support structure 11 and the constriction section is held short for rectangular shaped cantilevers, as in these types of cantilevers the strain decreases linearly with the distance from the clamped or supported end. For triangular cantilevers (cf. FIG. 6), where the strain is constant along the length of the whole beam, the constriction section may be placed at a larger distance from the supported end.

The characteristic dimensions, i.e., length L, width W, and thickness T of the cantilever constriction section 12 will be labeled in the following description by a subcript "1"; those of the cantilever beam by a subscript "2".

Figure 1B:
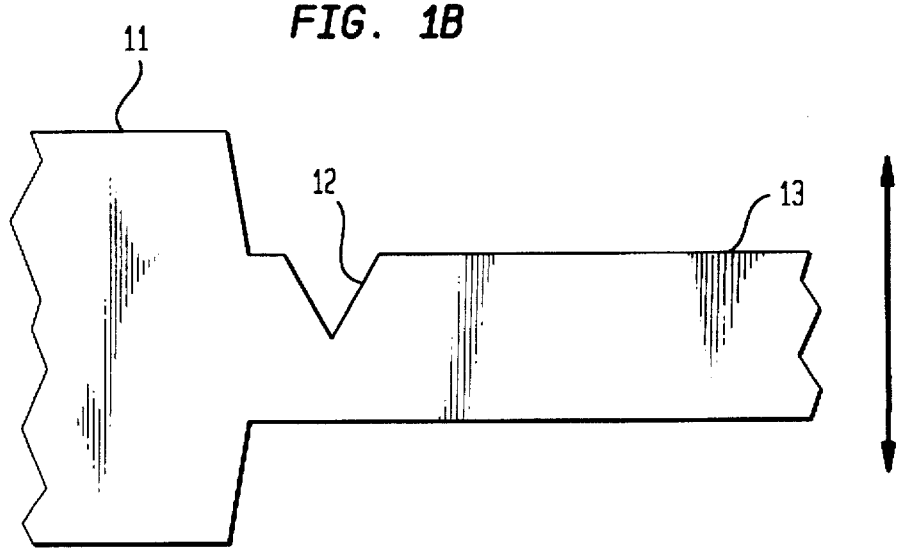

The deflection of the cantilever is considered to be in direction of the thickness T as indicated by the arrow in FIG. 1B. Under these conditions, the strain amplification and the stiffness reduction caused by the constriction is dominated by the "transverse constriction factor" ε, which in turn is defined as $$\epsilon = \frac{E_1}{E_2} \frac{T_1^3}{T_2^3} \frac{W_1}{W_2} \equiv \eta \tau^3 \beta; \quad [1]$$

and the "longitudinal factor" defined by $$\lambda = \frac{L_1}{L_2}, \quad [2]$$

wherein $L_1$ is the effective length of the constriction, which is larger than the geometrical length but usually does not exceed this length by more than a factor of two; and $L_1=L_2=L_c$ is the total length of the cantilever.

Figure 6:
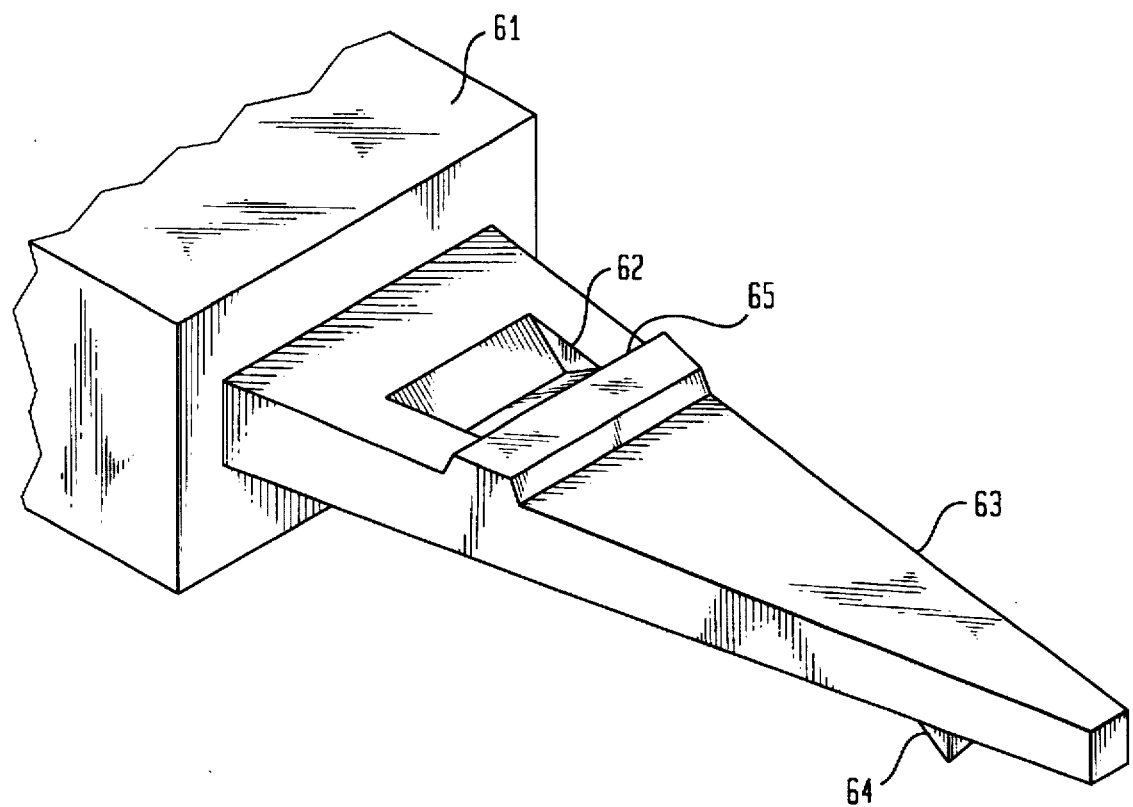
FIG. 6 shows a tilted top view on a triangular cantilever in accordance with the present invention.

Using basic relations of strain calculation in a suspended beam, the strain $\sigma_u$ at the top or bottom side of the constriction placed at the clamped end of the beam compares to the strain $\sigma_u$ of a beam with a uniformly rectangular cross section, equal stiffness, and dimensions $L_u=L_c$, $T_u=T_c$ but $W_u E_u < W_2 E_2$ according to:

$$v \equiv \frac{\sigma_c}{\sigma_u} = v\left(1 - \frac{1-\epsilon}{(1+\lambda)^n}\right) \simeq v(n\lambda + \epsilon), \quad [3]$$

wherein n=3 for a rectangular beam (FIG. 1A) and n=2 for a triangular beam (FIG. 6).

Equation [3] shows that both, $\epsilon$ and $\lambda$, i.e., the transverse and the longitudinal constriction factor, respectively, affect the strain enhancement. Although the thickness ratio $\tau$ contributes with the third power to $\epsilon$, it enters the strain amplification linearly as file prefactor in eqn. [3]. The optimum value of $\tau$ $$\tau_{opt} = ((1+\lambda)^n - 1)/2\beta\eta)^{1/3} \approx (n\lambda/2\beta\eta)^{1/3} \quad [4]$$

maximizes the strain amplification for given $\lambda$, $\beta$, and $\eta$ at $$v_{max} = \frac{2}{3}(1+\lambda)^n(2\beta\eta((1+\lambda)^n-1)^2)^{-1/3} \approx \frac{2}{3}(2(n\lambda)^2\beta\eta)^{-1/3}. \quad [5]$$

The corresponding optimal transverse constriction factor $\epsilon$ then is $$\epsilon_{opt} = \frac{n\lambda}{2}. \quad [6]$$

The width factor $\beta$ and the elasticity factor $\eta$ of the transverse constriction factor increase the highest amplification attainable by a thickness constriction alone by a factor of $(\beta\eta)^{-1/3}$. Taking for example a cantilever with $L_c=0.1$ mm, $W_2=20$ µm, $T_2=2$ µm, and $\lambda=0.01$, $\eta=1$, and assuming a thickness constriction alone ($\beta=1$), equations [4], [6], and [5] result in $\tau_{opt}=0.247$, ($\epsilon_{opt}=0.015$) and $v_{max}=5.2$, respectively. With an additional width constriction ($\beta=0.1$), however, the corresponding results are $\tau_{opt}=0.53$, ($\epsilon_{opt}=0.015$) and $v_{max}=$ 11.5. The thickness constriction $\tau$ is therefore primarily used to optimize $\epsilon$ (eqn. [6]), taking into account that it is difficult to make $\beta$ approximately equal to $\lambda$ in a cantilever with a typical width of 20 µm or below. It should be noted that in the case of $\beta\eta < \frac{1}{2}n\lambda = \epsilon_{opt}$, a maximal strain amplification is achieved with $\tau_{opt}>1$, i.e., even by enlarging the thickness within the constriction section. Therefore it is seen as the most prominent feature when designing a constriction in accordance with the present invention to approach the optimal value of $\epsilon$ as given by equation [6], independently from the actual layout of the secondary constrictions features $\tau,\beta$, and $\eta$.

While the preceding sections basic relations are described considered as being helpful to fully appreciate the achievements, of the present invention, in the following different embodiments of the invention are presented. The respective embodiments illustrate various types of constrictions. However, they do not present all variants and modification apparent to a skilled person.

All of following embodiments are manufactured using an ion milling technique. In this technique, the pre-fabricated cantilever is enclosed in a vaccum chamber at a base pressure of about $2.3\times10^{-6}$ mbar. From an ion source, gallium (ga) ion are accelerated to by a high voltage (10–30 kV), and foccussed on the target. A current of 12–300 pA is used to erode the material at the target spot. The efficiency of the process can be enhanced by directing a stream of chloride molecules to a target area. Grooves, trenches, holes, and other constrictions can be comfortably produced by applying this method. The equipment for ion milling is commercially available.

Other methods exist and are partly used, as described for example in K. Pedersen, "Silicon as a Mechanical Material" in: Proceedings of the IEEE, Vol. 70, No. 5, May 1982, pp. 421–457; as well as in U.S. Pat. No. 5,345,815, which are more suitable for mass production. Undercut structures, such as applied to manufacture the pre-fabricated cantilevers, can be etched exploiting the anisotropic effects of etching silicon with etchants like KOH and EDP. These etchants provide a highly anisotropic etch rate for the (100) and (111) oriented surfaces of silicon. Structures which should be preserved in the etching process are protected by masking layers, by doping, or by the appropriate choice of etching parameters, such as etching time, orientation of the surface, and etchants. Piezoresistive zones are generated and patterned by using for example arsenic implanted through a window of a protection layer. Electrical conductive paths are provided by sputtering of a metal. All of these manufacturing steps are well known, and hence are not regarded as being primary features of the current invention.

Figure 2A:
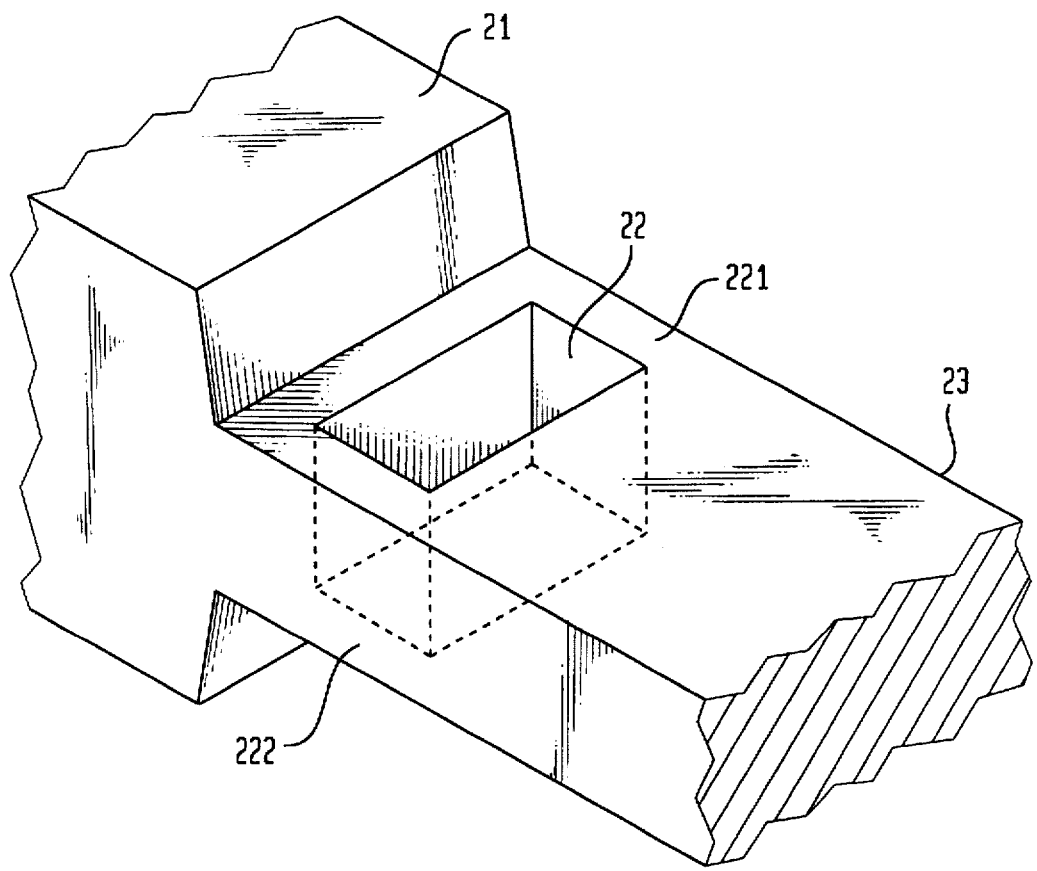
FIGS. 2A, B show different views on a second type of constriction section (width constriction) in a cantilever in accordance with the present invention.
Figure 2B:
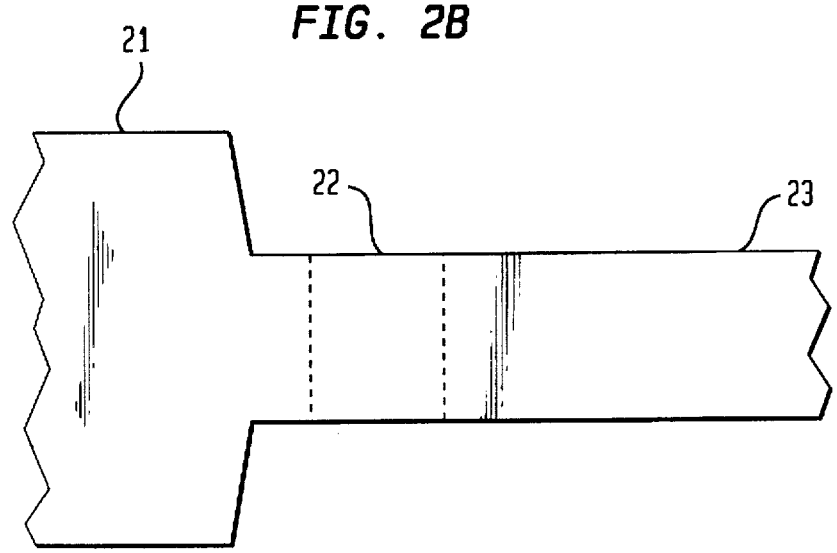

Referring now to FIGS. 2A, B, a constriction is achieved by a vertical hole 22 in the cantilever beam. Though an extreme amount of material is taken from the constriction section, both remaining bridges 221, 222 of base material provide a sufficient resistance against unwanted lateral deflection.

Figure 3A:
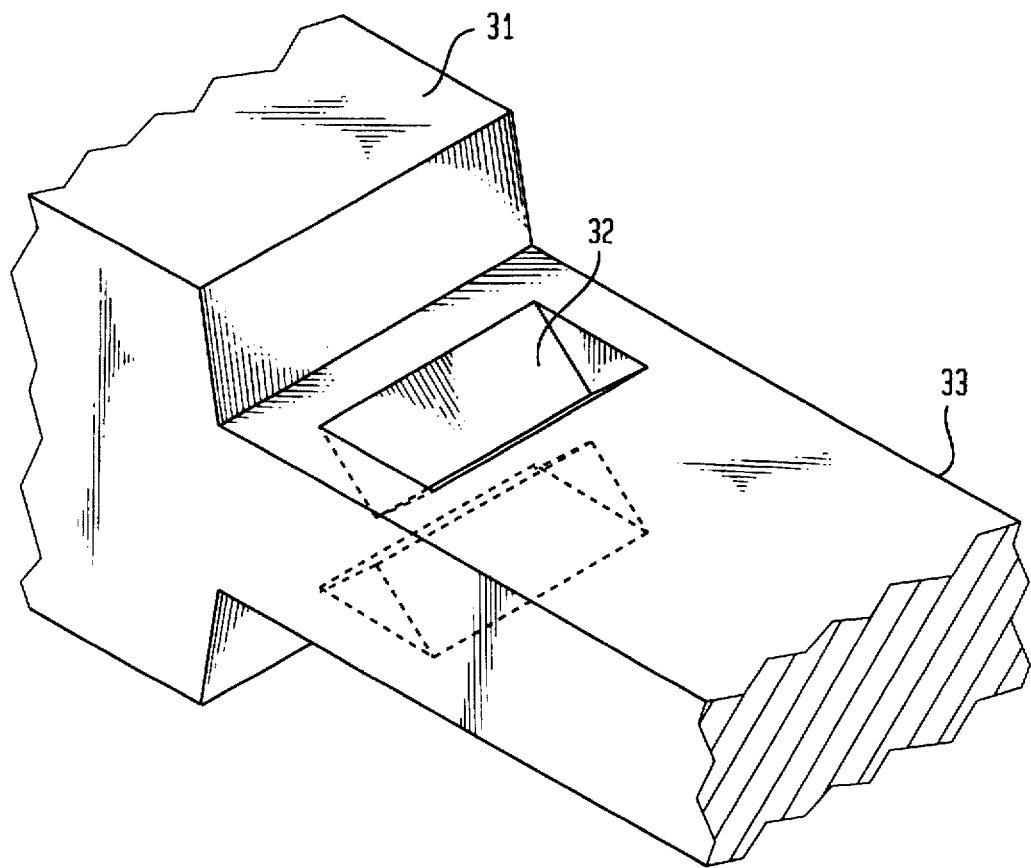
FIGS. 3A, B show different views on a third type of constriction section (symmetric thickness constriction) in a cantilever in accordance with the present invention.

Another type of constriction is illustrated with reference to FIGS. 3A, B. The constriction section 32 consists of two prismatic grooves etched into the faces of the cantilever. Bridges between the rest of the cantilever beam 33 and the support section 31 are left at both sides and between the grooves. The design is characterized by leaving a large cross section for heat transport arid a bridge for electrical leads along the cantilever. The strain enhancing properties of the constriction section are however maintained as most of the bridge material is close to the line of zero strain, also known as neutral line 34.

Figure 4A:
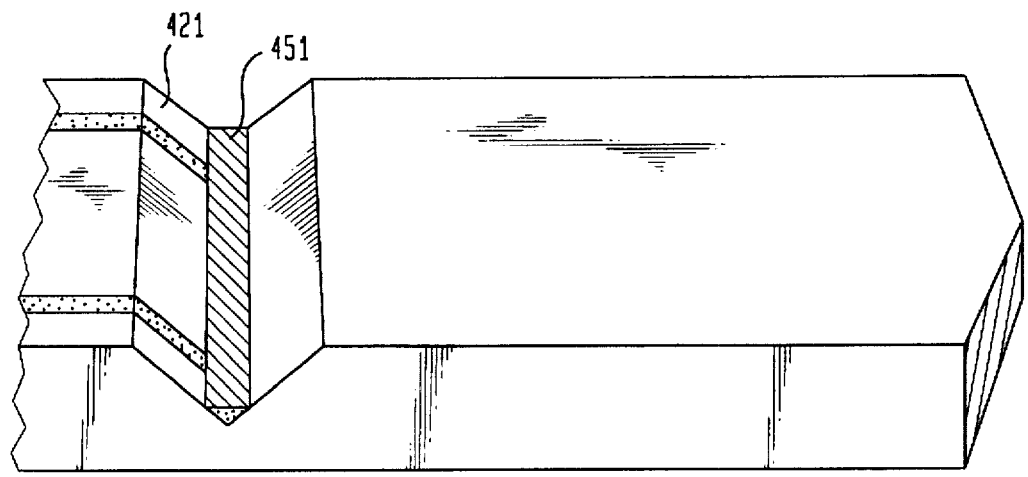
FIGS. 4A–4C illustrate different positions for a strain sensing element.
Figure 4B:
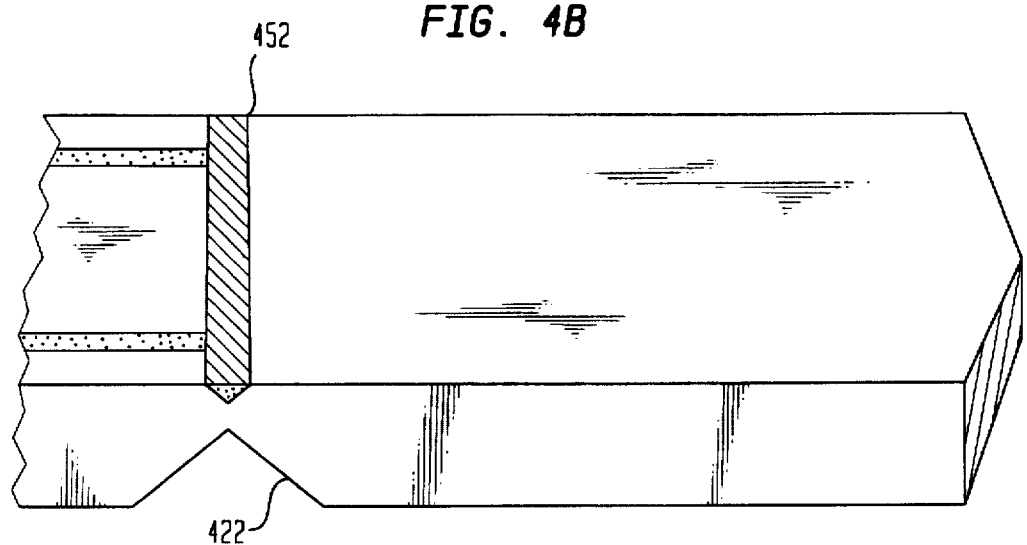
Figure 4C:
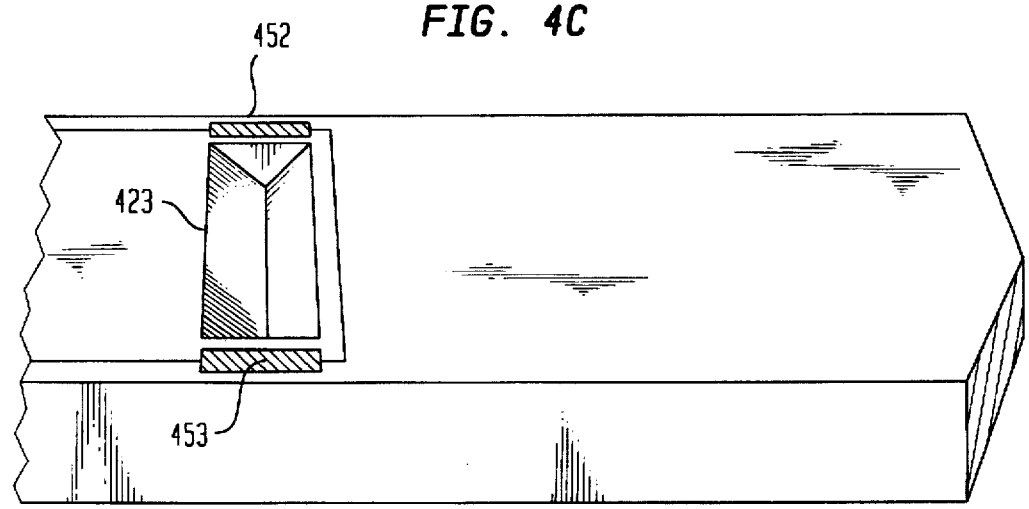

The variants of FIG. 4 show the strain sensor mounted at different locations within the constriction section. In the embodiment of FIG. 4A, the sensor 451 is buried at the bottom of the groove 421; in the embodiment of FIG. 4B it is placed opposite to the groove 422. In the embodiment of FIG. 4C, the strain sensor 453 is positioned at both (longitudinal) rims of the prismatic groove 423, which defines the constriction section.

Figure 5A:
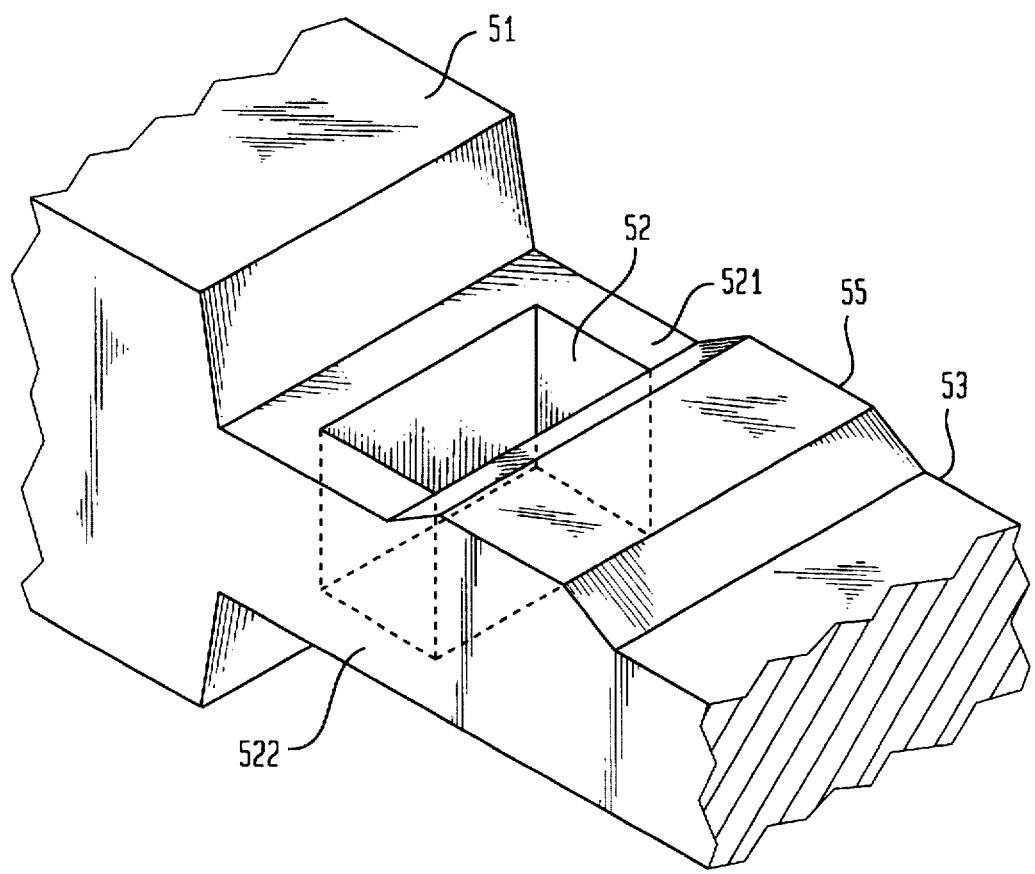
FIGS. 5A, B show different views on a cantilever with a constriction section and a section of enhanced stiffness.

In FIGS. 5A, B, the constriction 52 is followed by a section 55 having an enlarged cross section. This section provides art area of enhanced stiffness at the transition from the constriction to the remaining cantilever 53. This area may also extent into the constriction section 52 itself, e.g., by increasing the thickness of the two bridges 521, 522.

Figure 3B:
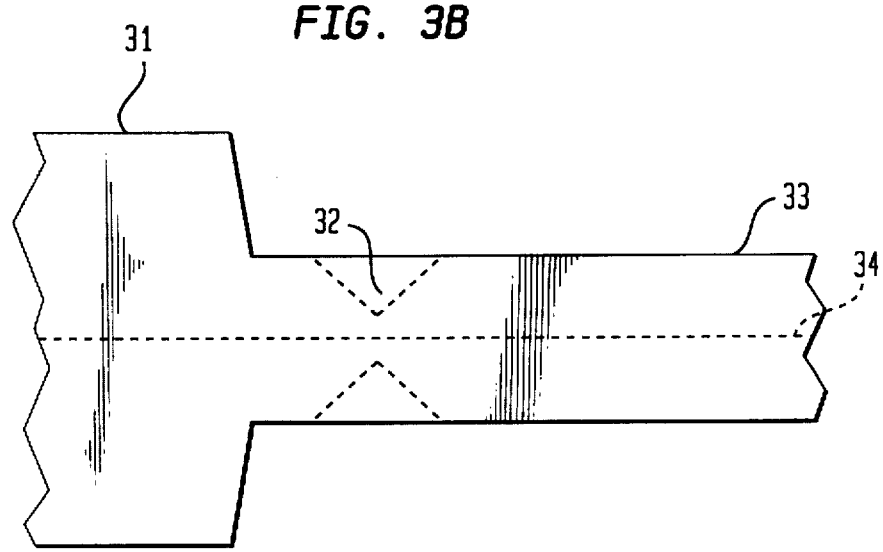
Figure 5B:
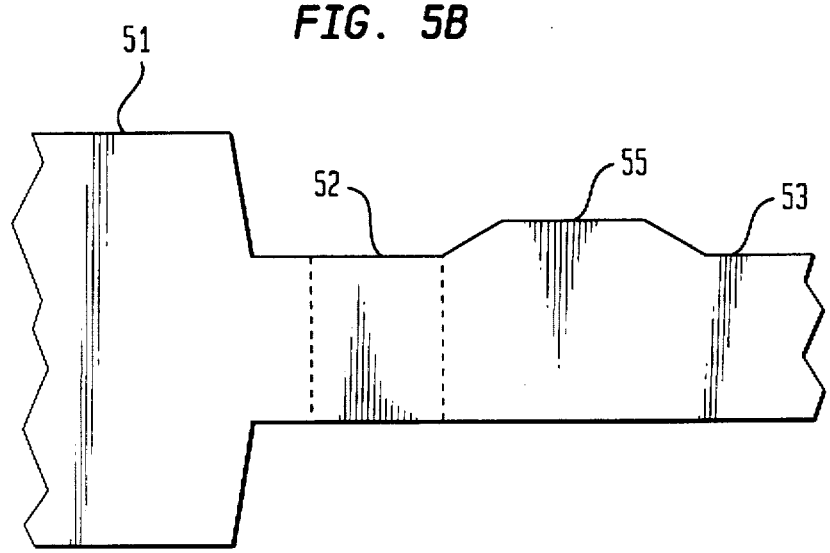

Independent from the type of constriction, the strain enhancement can be improved by the shaping the remaining cantilever beam itself. It is found that, when replacing its usual rectangular cross section by a triangular one, the sensitivity of the strain measurement can be further improved. A triangularly shaped cantilever beam has the particular advantage of showing a uniform strain in longitudinal direction, hence providing the possibility of placing the constriction section at a larger distance from the clamped end. In FIG. 6, the cantilever 63 has a triangular cross section in a horizontal plane. The cantilever further has a constriction formed by prismatic grooves 62 in its shown and hidden face similar to those depicted by FIGS. 3A and 3B. The cantilever also shows an area or enlarged cross section 65, which reduces the effective length of the constriction (cf. FIG. 5). A tip 64 is attached to the foremost pad of the cantilever for use in an AFM type application, e.g. surface inspection and/or modification. It should be noted that this and all other figures are not drawn to scale.

It is further noteworthy that the cantilever with a constriction can be used to enhance the sensitivity of known micromechanical pressure gauges or accelerometers. These instruments usually comprise a suspended stiff mass or a diaphragm supported by one or a plurality of beams, into which in most cases strain sensors are embedded. By introducing constrictions sections as described herein into those support beams, any deflection of the suspendended mass or diaphragm can be traced with increased precision. The leaching of the present invention can thus be transferred to and used in a large variety of micromechanical devices which require some sort of deflection measurement.

As the above described manufacturing process can and, with respect to the anisotropic etching, are applicable to batch or mass manufacturing, the present invention can be readily extended to arrays of equal of slightly modified cantilevers. These arrays could be used in a variety of applications, such as storage devices, touch sensitive screens, and the like.

We claim:

1. Cantilever having a constriction section of reduced lateral dimensions and/or reduced Young's modulus and at least one integrated strain sensing element forming a layer fully in contact with and/or embedded in said cantilever, wherein the length ($L_1$) of the constriction is less than ⅕ of the total length of the cantilever and the ratio n $\lambda/\epsilon$ is less than 9, with:

n being geometrical factor in the range of [1–10] approximately 2 to 3 depending on the shape of the cantilever;

$\lambda$ being a longitudinal constriction factor defined as the ratio of the length $L_1$ over the remaining length of the cantilever $L_2$; and $\epsilon$ being a transversal constriction factor defined as a product of the third power of the ratio of the thickness, the ratio of the widths, and the ratio of the Young's moduli of the cantilever in the constriction section and in the remaining part of the cantilever, respectively.

2. The cantilever of claim 1, including an attached tip for probing the surface of a sample.

3. The cantilever of claim 1, wherein the constriction section essentially consists of at least one groove extending in lateral direction with respect to the direction that the cantilever extends from its support.

4. The cantilever of claim 1, including in the immediate vicinity of the constriction section a section with an enhanced stiffness.

5. The cantilever of claim 1, including in the immediate vicinity of the constriction section a section with an enlarged cross section with respect to the cross section of adjacent sections of the beam.

6. The cantilever of claim 1, wherein the sensing element essentially extends in a lateral direction with respect to the beam cross-section.

7. The cantilever of claim 1, wherein the beam has an essentially triangular cross section in at least one of the horizontal and vertical planes.

8. The cantilever of claim 1 wherein the length $L_1$ of the constriction is less than ¹⁄₁₀th of the total length of the cantilever.

9. A scanning probe for an atomic force microscope comprising: a cantilever having a constriction section of reduced cross sectional dimension and reduced Young's modulus and at least one integrated strain sensing element, wherein the length ($L_1$) of the constriction section is less than ½ of the total length of the cantilever and the ratio n$\lambda/\epsilon$ is less than 9, with:

n being a geometrical factor which depends on the shape of the cantilever;

$\lambda$ being a longitudinal constriction factor defined as the ratio of the length $L_1$ over the remaining length of the cantilever $L_2$;

$\epsilon$ being a transversal constriction factor defined as a product of the third power of the ratio of the thicknesses, the ratio of the widths, and the ratio of the Young's moduli of the cantilever in the constriction section and in the remaining part of the cantilever, respectively; and an attached tip for probing the surface of a sample.

10. The cantilever of claim 9 wherein the constriction section comprises at least one groove extending in lateral direction with respect to the direction that the cantilever extends from its support.

11. The cantilever of claim 10 including in the immediate vicinity of the constriction section a section with an enhanced stiffness.

12. The cantilever of claim 10 including in the immediate vicinity of the constriction section a section with an enlarged cross section with respect to adjacent sections of the cantilever beam.

13. The cantilever of claim 10 wherein the shape of the cantilever is triangular and n is approximately 2.

14. The cantilever of claim 10 wherein the said integrated strain sensing element is positioned along the base of at least one groove.

15. The cantilever of claim 9 wherein the sensing element extends in a lateral direction with respect to the beam cross-section.

16. The cantilever of claim 9 wherein the beam has an essentially triangular cross section in at least one of the horizontal and vertical planes.

17. The cantilever of claim 9 wherein the shape of the cantilever is rectangular and n is approximately 3.

* * * * *